July 3, 1934.   R. C. CUNNINGHAM   1,964,722
CAMERA
Filed May 13, 1929   2 Sheets-Sheet 1
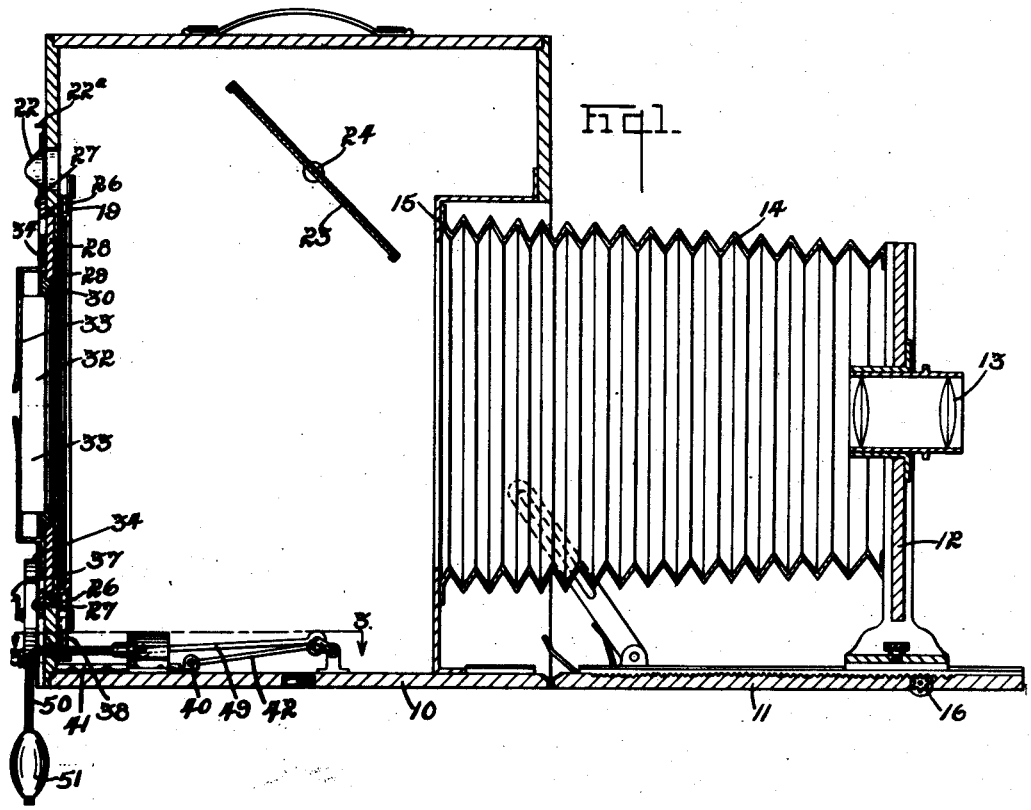
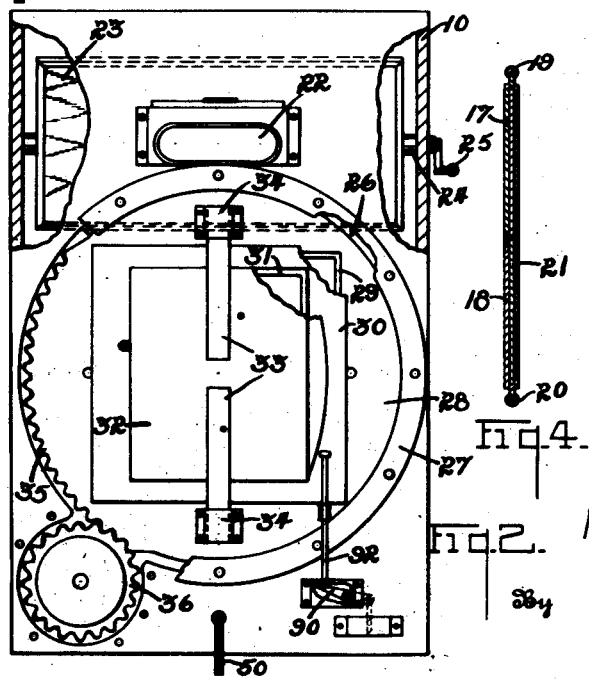
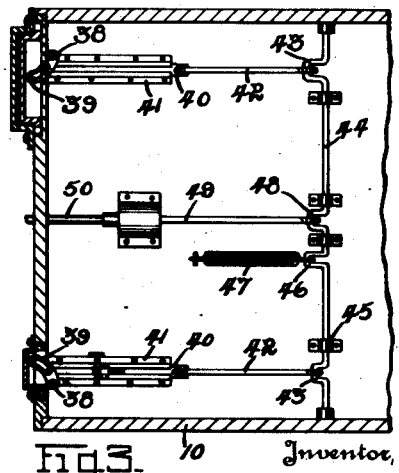
Inventor,
Raymond C. Cunningham
By Owen + Owen
Attorneys July 3, 1934.  R. C. CUNNINGHAM  1,964,722
CAMERA
Filed May 13, 1929  2 Sheets-Sheet 2
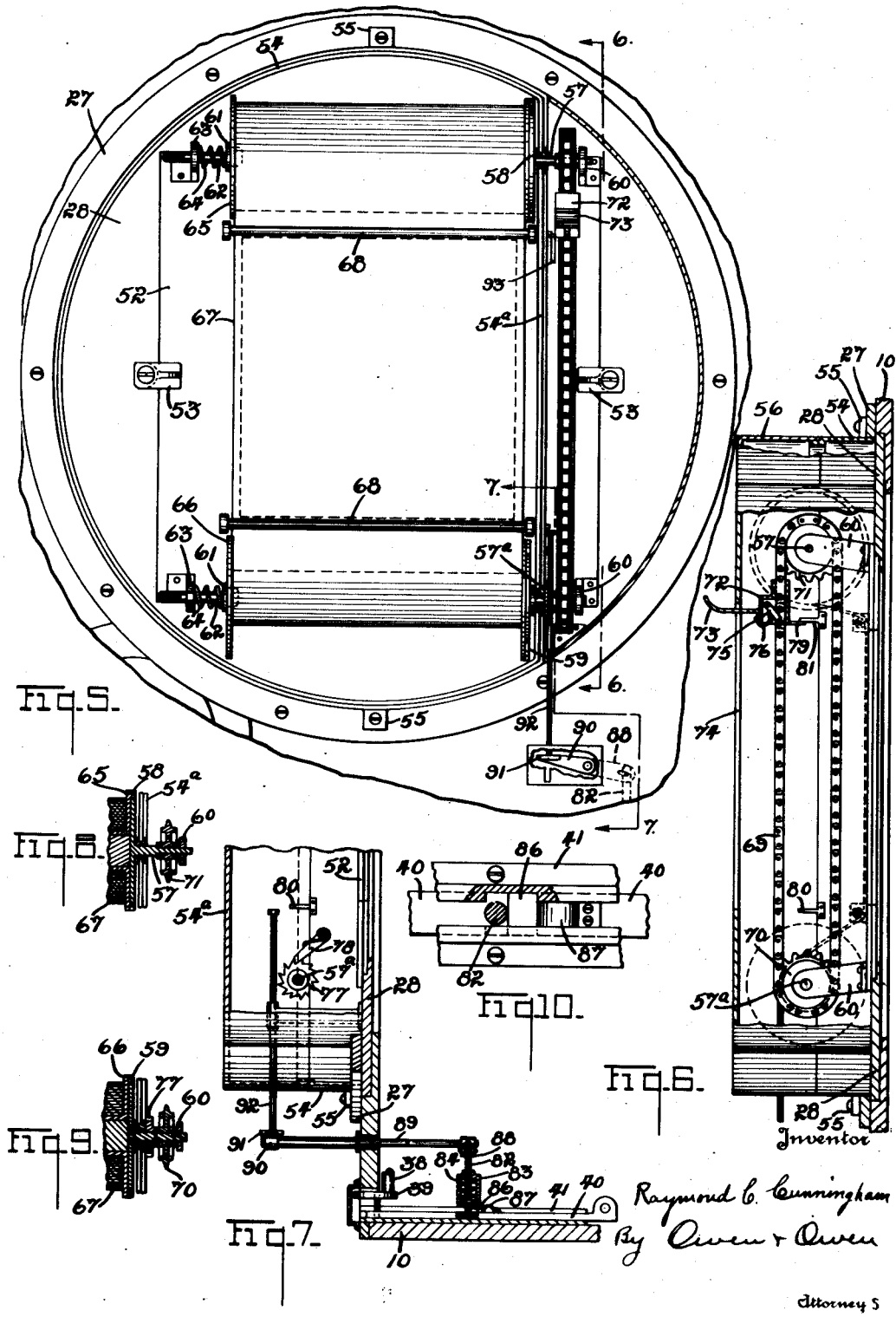

Patented July 3, 1934

1,964,722

UNITED STATES PATENT OFFICE 1,964,722

CAMERA

Raymond Clement Cunningham, Toledo, Ohio

Application May 13, 1929, Serial No. 362,663

3 Claims. (Cl. 95—42)

This invention relates to a camera in which, preparatory to, instantly before, and simultaneously with taking the picture, the image formed by the lens is focused upon an opaque surface located immediately in front of the sensitized plate or film.

One object of the invention is to provide an image receiving surface on the back of the shutter, and in connection therewith, to provide improved means whereby the image may be observed and the correct focus obtained while the plate or film and the shutter in front of the same are in position for immediate operation, thus making it possible to take photographs, particularly those of small children, at the precise moment when they assume the most desirable pose.

A further object is to provide an improved shutter, particularly adapted for this type of camera, and improved means for actuating the same.

In connection with the above features, the camera is so constructed that either plates, film packs or roll film may be used interchangeably, and an improved mounting is provided, whereby the same may be adjusted through an angle of ninety degrees about its focal axis, without changing the position of the camera box or casing.

Provision is also made for automatically locking the shutter operating mechanism after each exposure until it is manually released or until it is automatically released when the film is changed, thereby preventing the possibility of a double exposure.

The various features of my invention, and the advantages thereof, will be more fully explained in the following detail description taken in connection with the accompanying drawings, which illustrate the preferred embodiment thereof.

In the drawings:

Figure 1 is a vertical longitudinal section through the camera, with a film pack in position and with the lens advanced.

Figure 2 is a rear elevation of the same, with parts broken away.

Figure 3 is a horizontal section taken on the line 3—3 of Figure 1.

Figure 4 is a horizontal sectional view of the shutter.

Figure 5 is a rear elevation on an enlarged scale with parts broken away, and showing a roll film mounted in operative position.

Figure 6 is a sectional view taken substantially on the line 6—6 of Figure 5.

Figure 7 is a sectional view taken substantially on the line 7—7 of Figure 5.

Figure 8 is a detail sectional view of one of the mountings for the roll that carries the unexposed film.

Figure 9 is a similar view of one of the mountings for the take up roll.

Figure 10 is an enlarged detail view of the stop mechanism that prevents a double exposure.

As illustrated in the drawings, the invention is embodied in a camera having a box or casing 10, the front side of the box having a bed 11 hinged thereto and adapted to support a camera front 12 which carries the lens 13. The front 12 is connected by a bellows 14 to a frame 15 secured within the front portion of the box and is adjustable by means of the usual rack and pinion 16 to secure the proper focus. The shutter comprises leaves 17 and 18 secured to spindles 19 and 20 respectively, which are rotatably mounted inside the rear wall of the box 10. The front faces of these shutter leaves carry image receiving surfaces 21. I have found it desirable to use sheets of white bristol board for these surfaces and these sheets may be glued to the front faces of the shutter leaves. Of course, many other materials may be used, but it is preferred that the surface should be white and not reflective to any great degree.

For viewing the image formed on the front face of the shutter, it is desirable to provide a sight opening 22 into the upper part of the camera box, and if necessary, in order to exclude light from the box, this opening may be covered by a slide 22ª of colored glass or similar material. Through this opening the image from the surface 21 is viewed by means of a mirror 23 which is carried by trunnions 24 mounted in the sides of the box, one of the trunnions being preferably provided with a crank 25 for securing the proper adjustment. While viewing the image reflected by this mirror, the focal length may be adjusted, and at any moment when the desired focus and pose is obtained, the shutter may be immediately opened, by means hereinafter described, to take the picture.

The front wall of the camera box has a circular opening about which is an annular rabbeted seat 26 adapted to receive a plate 28 which is retained in position by an annular rim 27 secured to the box. This plate 28 is formed with a square or rectangular opening which is bordered by a seat 29 adapted to interchangeably receive mountings for plates, film pack or roll film.

As shown in Figures 1 and 2, the mounting for a film pack comprises a frame 30 having a rectangular opening bordered by a seat 31 adapted to receive the pack 32 which is retained in position by clips 33 mounted in keepers 34. Various frames 30 may be provided having openings of different size so that a single camera may be used for different sized packs.

The plate 28 is rotatably adjustable on the seat 26 through an arc of ninety degrees, suitable means being provided to limit its rotation in either direction. For effecting this rotational adjustment, the plate 28 is formed along a portion of its circumference with gear teeth 35 which mesh with a pinion 36, the latter being rotatable by means of a crank 37. Thus, with a rectangular film, the frame supporting the same may be quickly adjusted, without altering the position of the camera box, to bring the longest dimension of the film into either horizontal or vertical position.

For operating the shutter, each spindle 19, 20, has a reduced downwardly projecting end portion 38 to which is secured a crank 39. This crank has a pin and slot connection with a slide 40 which is mounted in a guideway 41 and which is connected by a link 42 to a crank 43 formed on a shaft 44 mounted in bearings 45 in the bottom of the camera box. The adjacent edges of the shutter leaves 17 and 18 are rabbeted and overlap so as to form an effective light excluding closure. In closing the shutter, therefore, the leaf 18 must move slightly in advance of the leaf 17. The crank 43, which is connected to the spindle 20, is therefore pitched slightly in advance of the other crank 43. Whenever the shutter is opened, it is at once automatically closed through the medium of a crank 46 formed on the shaft 44 and connected by a spring 47 to the bottom of the camera box. The opening movement of the shutter is effected through the medium of a crank 48 formed on the shaft 44 and connected to a plunger 49, which is advanced in the usual manner by means of an air tube 50 and a compressible bulb 51.

In adapting the camera for using a roll film instead of a film pack, as illustrated in Figures 5 to 9 inclusive, the plate 30 is replaced by the plate 52 which is secured beneath clips 53. A ring 54 is set within the rim 27 and may be secured to the latter by means of screw held ears 55. Fitting on this ring is a cover 56, which is removable to change the film. The ring 54 has a straight portion 54a adjacent one side of the opening through the plate 52 and is provided with bearings for spindles 57 and 57a, which carry roll supporting heads 58 and 59 respectively. The outer ends of the spindles 57 and 57a are mounted in bearings 60 which are secured to the edge of the plate 52. Opposed to the heads 58 and 59 are heads 61 which are secured to spindles 62 slidably mounted in ears 63 secured to the plate 52. The heads 61 are resiliently held by the springs 64 in position to support the rolls 65 and 66 but may be easily retracted for changing the rolls in the usual manner. The film 67, as it is used, is drawn from the roll 65 on to the take up roll 66, the intermediate portion being held closely against the opening in the frame by means of small guide rollers 68. As one strip is used up, it is removed from the camera in the usual manner, the empty roll is then placed in position as the take up roll and a new roll of film is inserted.

The device for advancing the film after an exposure has been made comprises a sprocket chain 69 which passes about a sprocket wheel 70 secured to the spindle 57a and about an idler sprocket 71 rotatable on the spindle 57. The chain 69 is actuated by means of a clip 72 mounted on its rear lap and having a finger piece 73 projecting through an opening 74 in the casing 56. A dog 75, mounted within the clip 72, is normally held in engagement with the chain links by a spring 76 so that downward movement of the clip 72 causes a corresponding movement of the sprocket chain but in the return movement of the clip, the dog rides over the chain links, while the sprocket chain is positively held against backward movement by means of a ratchet 77 secured to the spindle 57a and held by a spring controlled pawl 78. The distance through which the film is advanced after each exposure is determined by a finger 79 projecting from the clip 72 and adapted to engage a stop 80 at the completion of its forward movement and adapted to engage a similar stop 81 at the completion of its rearward movement.

In connection with the roll film mechanism, it is desirable to use a roll of film in which the sensitized portions of proper size for the pictures to be taken are spaced apart and connected by strips of unsensitized material. Since the diameter of the film on the take up roll continually increases, while the diameter of the film on the roll 65 continually decreases as the film is advanced, it is essential that these connecting strips of unsensitized material should gradually increase in width toward the center of the roll.

In order to prevent the possibility of a double exposure, a pin 82, as shown in Figures 5, 7 and 10, is mounted within a sleeve 83 above the slide 40 and is adapted to drop into a hole in the slide to lock the latter as soon as the shutter has been opened and closed. The movement of the pin 82 into locking relation to the slide is facilitated by a spring 84 which is located within the sleeve 83 and bears against a head 85 secured to the pin. Whenever the pin 82 is raised out of locking relation with the slide 40, however, it is prevented from again locking the shutter by means of a block 86 which is slidably mounted within the guideway 41 and which is advanced by a spring 87 into the path of the pin 82 as soon as the latter is raised. After the slide 40 has been advanced to open the shutter, upon the return movement of the slide 40, the pin 82 will ride on the surface of the slide against the edge of the block 86 and force the block against the spring 87, compressing the latter, while the pin 82 drops into the hole in the slide under the influence of the spring 83.

In order that the pin 82 may be lifted to unlock the shutter, the pin is mounted at the end of a crank 88 carried by one end of a shaft 89, while the other end of the shaft carries a crank arm 90 having a head 91 at its outer end which is engageable by a rod 92 slidably mounted in the path of a finger 93 carried by the clip 72. Consequently, when the finger piece 73 is moved to the lower end of the opening 74 to advance the film after exposure, the finger 93 automatically depresses the rod 92 and actuates the crank shaft 89 to unlock the shutter for taking the next picture. In case the operator forgets to advance the film, the shutter will remain locked so that a double exposure is impossible. It is possible, however, to unlock the shutter by manually pushing down on the rod 92.

While I have shown and described in considerable detail the preferred embodiment of the invention, it is apparent that the same may be considerably modified without departing from the scope of the invention as defined in the claims.

What I claim is:

1. In a camera, the combination with a casing, of means for holding a sensitive element for exposure, focus adjusting means, a shutter immediately in front of said holding means and having on its front face an image reflecting surface, and means for opening and closing the shutter as the image is being viewed, said casing and holding means including means for holding the sensitive element and the lens stationary from the time that the focus is adjusted until the shutter has been opened and closed.

2. In a camera, the combination with a casing, of means for holding a sensitive element for exposure, focus adjusting means, a shutter immediately in front of said holding means and having on its front face an image reflecting surface, said casing having a sight opening above said holding means, a mirror in the upper part of the casing in which the reflection of the image may be viewed, and means for immediately opening and closing the shutter at any desired moment as said reflection is visible, while the sensitive element and lens are held stationary.

3. In a camera, the combination with a casing, of a shutter within the casing having on its front face a white image reflecting surface, means for focusing the image on said reflecting surface, means for viewing said image, and means for opening and closing the shutter at any desired moment as the image is being viewed, while the lens remains stationary and while the sensitive element remains stationary for exposure immediately behind the normal position of the shutter.

RAYMOND CLEMENT CUNNINGHAM.